No. 771,824. PATENTED OCT. 11, 1904.
F. E. IVES.
CHANGEABLE SIGN, PICTURE, &c.
APPLICATION FILED OCT. 27, 1903.
NO MODEL.
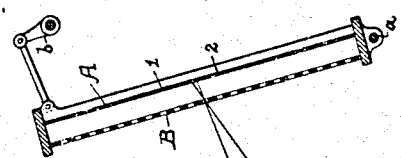
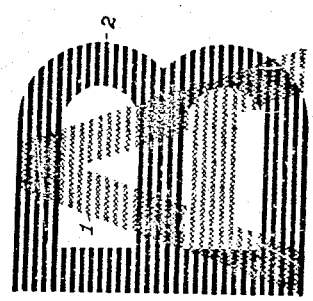
Fig. 1.
Fig. 2.
Witnesses:
Hamilton E. Turner
Titus H. Ives
Inventor;
Frederic E. Ives,
by his Attorneys
Howson & Howson No. 771,824.  
Patented October 11, 1904.

UNITED STATES PATENT OFFICE.

FREDERIC E. IVES, OF WEEHAWKEN, NEW JERSEY.

CHANGEABLE SIGN, PICTURE, &c.

SPECIFICATION forming part of Letters Patent No. 771,824, dated October 11, 1904.

Application filed October 27, 1903. Serial No. 178,731. (No model.)

*To all whom it may concern:*

Be it known that I, FREDERIC E. IVES, a citizen of the United States, and a resident of Woodcliff-on-the-Hudson, Weehawken, New Jersey, have invented certain Improvements in Changeable Signs, Pictures, &c., of which the following is a specification.

The object of my invention is to provide a composite picture, sign, or other representation which will show a change of object, design, or lettering as the angle of view of the observer changes. This object I attain in the manner hereinafter set forth, reference being had to the accompanying drawings, in which—

Figure 1 is a diagram illustrative of my invention, and Fig. 2 is a view illustrating part of a composite design made in accordance with my invention.

In carrying out my invention I first make by photography a line composite picture or design comprising two or more different parts, substantially as in the production of the line composite photograph, which constitutes one of the elements of the parallax stereogram forming the subject of my Patent No. 725,567, dated April 14, 1903, except that the composite line picture or design is not a composite of a stereoscopic pair of images, and with the further difference that the lines may be disposed horizontally instead of vertically and, in fact, are by preference so disposed. In Fig. 2 of the drawings I have shown such a line composite design comprising the letters "A" and "B," the lines which form one letter alternating with the lines which form the other letter. This line composite design is preferably formed upon a plate of glass or other transparent or translucent material, so that it can be illuminated by transmitted light. In front of the composite design thus produced I mount a screen having alternate opaque lines and clear spaces, which screen may consist of a glass plate having opaque lines formed upon it, or it may consist of a plate of metal or other opaque material with alternating bars and slots, preference being given to the lined plate, because of the much finer gradation of the lines as compared with a slotted metallic plate.

The screen is mounted at such a distance in front of the composite design and the clear spaces of the screen bear such relation to the lines of said composite design that when the latter is viewed through said clear spaces change in the angle of view will result in changing the element of the composite design exposed to view. This will be understood on reference to Fig. 1 of the drawings, in which A represents a composite picture one element of which consists of lines 1 and the other element of lines 2 alternating with said lines 1, and B represents the lined screen mounted in front of said composite picture.

If the picture is viewed through the spaces of the screen from the point *x*, the lines 2 only will be visible, the lines 1 being obscured by the opaque portions of the screen, while if the picture is viewed from the point *y* the lines 1 only will be visible, the lines 2 being hidden from view by the opaque portions of the screen, while from a point of view *w* between the points *x* and *y* there will be an apparent blending of the two designs.

If the lines of the composite picture and of the viewing-screen in front of the same are horizontal, the picture will change to the view of a person approaching it, while if the lines of the picture and screen are vertical the picture will change to the view of a person passing it, or if means are provided for vibrating the composite picture and its viewing-screen the picture will change when viewed from a stationary view-point, the vibration of the picture and its screen altering the effective angle of vision of the observer.

In Fig. 1 I have shown the structure comprising the composite picture and viewing-screen pivoted at *a* and connected at the upper end to a crank *b*, rotation of which effects vibration of the structure in the proper plane.

Of course it will be understood that in neither figure of drawings has any attempt been made to show the actual proportions of the lines of the composite design or the proportions of the clear and opaque spaces of the viewing-screen in respect to each other or to the lines of the composite design, as such a showing would be impracticable within the limitations imposed upon the draftsman.

Having thus described my invention, I claim and desire to secure by Letters Patent—

1. A changeable sign, picture, or other representation consisting of a photographic transparency comprising a plurality of designs each composed of lines alternating with those of the other design or designs, in combination with a viewing-screen having alternate clear and opaque spaces, said viewing-screen being mounted at such a distance in front of the composite design that the separate elements of the latter are separately and independently visible to an observer through the clear spaces of the screen by reason of a change in the angle of observation, substantially as specified.

2. A changeable sign, picture, or other representation consisting of a plurality of designs each composed of lines alternating with those of the other design or designs, in combination with a viewing-screen having alternate clear and opaque spaces, said viewing-screen being mounted at such a distance in front of the composite design that the separate elements of the latter are separately and independently visible to an observer through the clear spaces of the screen by reason of a change in the angle of observation, the structure being combined with means for positively vibrating the same, substantially as specified.

3. A changeable sign, picture or other representation consisting of a photographic transparency comprising a plurality of designs, each composed of lines alternating with those of the other design or designs, in combination with a viewing-screen, consisting of a transparent plate having opaque lines formed upon it, said viewing-screen being mounted at such a distance in front of the composite design that the separate elements of the latter are separately and independently visible to an observer through the clear spaces of the screen by reason of a change in the angle of observation, substantially as specified.

In testimony whereof I have signed my name to this specification in the presence of two subscribing witnesses.

FREDERIC E. IVES.

Witnesses:
   H. W. HAYWARD,
   TREADWAY CLEVELAND.